(12) United States Patent
Mehta

(10) Patent No.: US 7,155,717 B2
(45) Date of Patent: Dec. 26, 2006

(54) APPORTIONING A SHARED COMPUTER RESOURCE

(75) Inventor: Kalpesh Dhanvantrai Mehta, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 971 days.

(21) Appl. No.: 09/771,374

(22) Filed: Jan. 26, 2001

(65) Prior Publication Data

US 2002/0143843 A1    Oct. 3, 2002

(51) Int. Cl.
*G06F 9/46* (2006.01)
*G06F 3/00* (2006.01)
*G06F 13/36* (2006.01)

(52) U.S. Cl. .................. 718/102; 718/103; 710/40; 710/309

(58) Field of Classification Search .............. 718/102, 718/103; 709/103, 102; 710/40, 309
See application file for complete search history.

(56) References Cited

U.S. PATENT DOCUMENTS

| | | | |
|---|---|---|---|
| 5,339,443 A * | 8/1994 | Lockwood ................ 710/244 |
| 5,884,051 A * | 3/1999 | Schaffer et al. ............. 710/107 |
| 6,041,040 A | 3/2000 | Beshai et al. |
| 6,067,557 A * | 5/2000 | Hegde .................... 718/103 |
| 6,088,331 A | 7/2000 | Beshai et al. |
| 6,272,517 B1 * | 8/2001 | Yue et al. ................ 718/102 |
| 6,356,546 B1 | 3/2002 | Beshai |
| 6,363,445 B1 * | 3/2002 | Jeddeloh .................. 710/113 |
| 6,378,051 B1 * | 4/2002 | Henson et al. ............ 711/151 |
| 6,393,590 B1 | 5/2002 | Wood et al. |
| 6,404,735 B1 | 6/2002 | Beshai et al. |
| 6,580,721 B1 | 6/2003 | Beshai |
| 6,646,986 B1 | 11/2003 | Beshai |
| 6,667,956 B1 | 12/2003 | Beshai et al. |
| 6,721,271 B1 | 4/2004 | Beshai et al. |
| 6,820,263 B1 * | 11/2004 | Klappholz ................ 718/108 |

OTHER PUBLICATIONS

Silberschatz, Galvin and Gagne, "Applied Operating System Concepts", 2000, Jonh Wiley & Sons, Inc., First Edition, pp. 417-418.*

* cited by examiner

*Primary Examiner*—William Thomson
*Assistant Examiner*—Li Zhen
(74) *Attorney, Agent, or Firm*—Fish & Richardson P.C.

(57) ABSTRACT

Disclosed a processes and an apparatus which relates to an improved technique for sharing a computer resource.

10 Claims, 2 Drawing Sheets

APPORTIONING A SHARED COMPUTER RESOURCE

BACKGROUND

The present invention relates to apportioning a shared computer resource.

In computer systems, it is commonplace for multiple processes to require access to a shared resource which is capable of servicing only a single process during a time interval. Such shared resources include, for example, central processing units, memory, as well as other devices. A technique for controlling access to the shared resource is necessary to ensure effective use of the shared resource.

In a known method, each of the multiple processes are assigned a relative priority which is used as the basis for apportioning access to the shared resource. Such a technique of allocating a priority to each of multiple processes, as well as apportioning the access of each process to the shared resource often results in less than optimal utilization of the shared resource, e.g., starvation of low-priority processes.

DESCRIPTION AND PREFERRED EMBODIMENTS

A technique for controlling access to a shared computer resource by two or more computer processes requiring use of the shared computer resource is disclosed. The technique comprises the steps of controlling access to a shared computer resource by each of two or more computer processes requiring access to a shared computer resource by:

assigning an access value and a relative priority value (such as "high" and "low" priority values) to each of the computer processes;

and thereafter for each access cycle permitting each computer process access to the shared computer resource in accordance with each process' access value and relative priority value such that for each access cycle;

providing access to each computer processes having pending high priority requests is provided access to the shared computer resource until the access value of each such computer process is exhausted, and thereafter;

providing access to each computer process having pending low priority requests access to the shared computer resource until the access value of each such computer process is exhausted whereupon;

the access values of each computer process is reallocated by adding to any existing access value of each process the access value originally assigned prior to any access cycle, and thereafter;

any remaining pending requests for access present in any computer process are provided access to the shared computer resource as a low priority request until all pending requests for access to the shared computer are satisfied.

As a further optional, but frequently desirable step, after all pending requests for access to the shared computer are satisfied, the access cycle is restarted.

Figure 1:
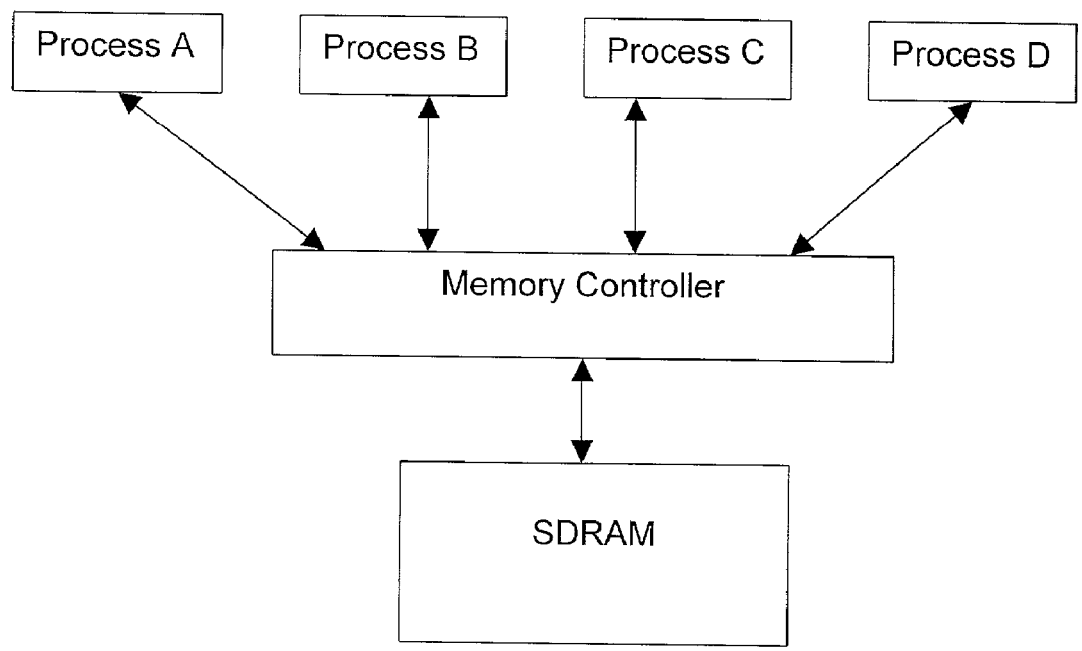
FIG. 1 depicts a computer-based shared memory system.

Although this technique will be described with reference to the computer based shared memory system (100) shown on FIG. 1., the technique is applicable to many other systems both computer based, as well as non-computer based systems. As shown in FIG. 1, the computer based shared memory system (100) includes a representation of multiple computer processes (110, 112, 114, 116), a memory controller (120), and as a shared resource, a shared memory bank such as a SDRAM memory bank (130). While the present example illustrates SDRAM memory bank (130) as the shared computer resource, the techniques described herein may be used to improve the utilization of other types of shared computer resources (and non-computer resources) as well. Also, although the computer-based shared memory system (100) includes a representation of four computer processes, any number of computer processes may benefit from the techniques described herein.

The computer processes (110) and (112) can represent isochronous processes that require access to the SDRAM memory bank (130) on a generally regular time interval. The computer processes (114) and (116) can represent asynchronous processes that may require access to the SDRAM memory bank (130) on a generally irregular time interval. In other implementations all of the computer processes can be of the same type (asynchronous, isochronous).

Each of the computer processes (110, 112, 114, 116) is assigned an access value. Each of the computer processes (110, 112, 114, 116) is assigned an access value which apportions the amount of access to the shared computer resource by the computer process, here a SDRAM memory bank (130). The access value assigned to each of the computer processes (110, 112, 114, 116) represents a portion of the total value provided by the shared computer resource, and may represent a fraction or proportion of the total value provided by the shared computer resource. The access value may be associated or represented by a counter which may be incremented when access values are allocated to the computer process, as well as decremented when the computer process is provided access to the shared computer resource. Each of the computer processes (110, 112, 114, 116) is also assigned a relative priority value, usually either a "high" or "low" priority value. Assignment of the access values and the priority value can take place at any time, but conveniently each be assigned at the initiation of a technique, or at a reset of the technique, or at the initiation or conclusion of an access cycle. Once these values are assigned, each of the computer processes may enter either a high priority request or a low priority request for access to the shared computer resource. These requests are received by the memory controller which arbitrates all the requests and provides access to the shared computer resource according to the following protocol.

The memory controller evaluates the type of pending request, which is represented by the priority value of each computer process as well as the existing access value for each process. If the access value for each process is not zero, then the memory controller grants to each computer process having a pending "high" priority request access to the shared computer resource until the access value for each process is exhausted. The computer process is granted access to the shared computer resource for an interval equal to its access value, and this is repeated for each of the remaining computer process having pending "high" priority requests. Subsequently, the memory controller determines if there are any pending "low" priority requests present. If none are pending, the access values for each computer process is reallocated by adding to any existing access value of each process the access value originally assigned prior to any access cycle. Optionally, but in most cases desirably, the process cycle is restarted. If however there are pending "low" priority requests present, then the memory controller grants to each computer process having a pending "low" priority request and whose access value is not zero access to the shared computer resource until the access value for each process is exhausted, and thereafter the access values for each computer process is reallocated by adding to any existing access value of each process the access value originally assigned prior to any access cycle, and thereafter if there are any remaining computer process having pending "high" priority requests whose requests were previously unsatisfied, they are treated as "low" priority requests and the memory controller grants to each computer process having such a pending "low" priority request and whose access value has not been exhausted access to the shared computer resource until the access value for each process is exhausted. Thereafter, when all outstanding "high" priority and "low" priority requests have been satisfied, the access values for each computer process is reallocated by adding to any existing access value of each process the access value originally assigned prior to any access cycle.

In some implementations, only those pending requests present at the start of the process will be processed until all pending requests for access by two or more computer processes are satisfied, prior to the acceptance of and processing of new requests for access to the shared computer resource.

In further implementations all pending requests for "high" priority access are satisfied, before pending requests for "low" priority access are given access to the shared computer resource.

In another implementation, only those pending "high" priority and "low" priority requests present at the start of the process will be given access to the shared computer resource, wherein first all pending requests for "high" priority access are granted access for a time equal to their access values, after which all pending requests for "low" priority present at the start of the process are given access to the shared computer resource, for a time equal to their access values. In a variation on this implementation, after all pending requests for "high" priority access are granted access for a time equal to their respective access values, any unsatisfied pending requests for "high" priority access are recategorized as "low" priority requests, and/or new requests for access to the shared computer resource are accepted and recategorized as "low" priority requests, and then, all pending requests for "low" priority access are given access to the shared computer resource for a time equal to their access values.

Conveniently, each of the priority values and each of the access values are represented by an integer number, which facilitates incrementing and decrementing of the priority values and access values whenever access to the shared computer resource is provided by the memory controller in order to satisfy a pending request for access. Each of the priority values and each of the access values may be associated with a storage register, which itself is conveniently located with the memory controller.

Figure 2:
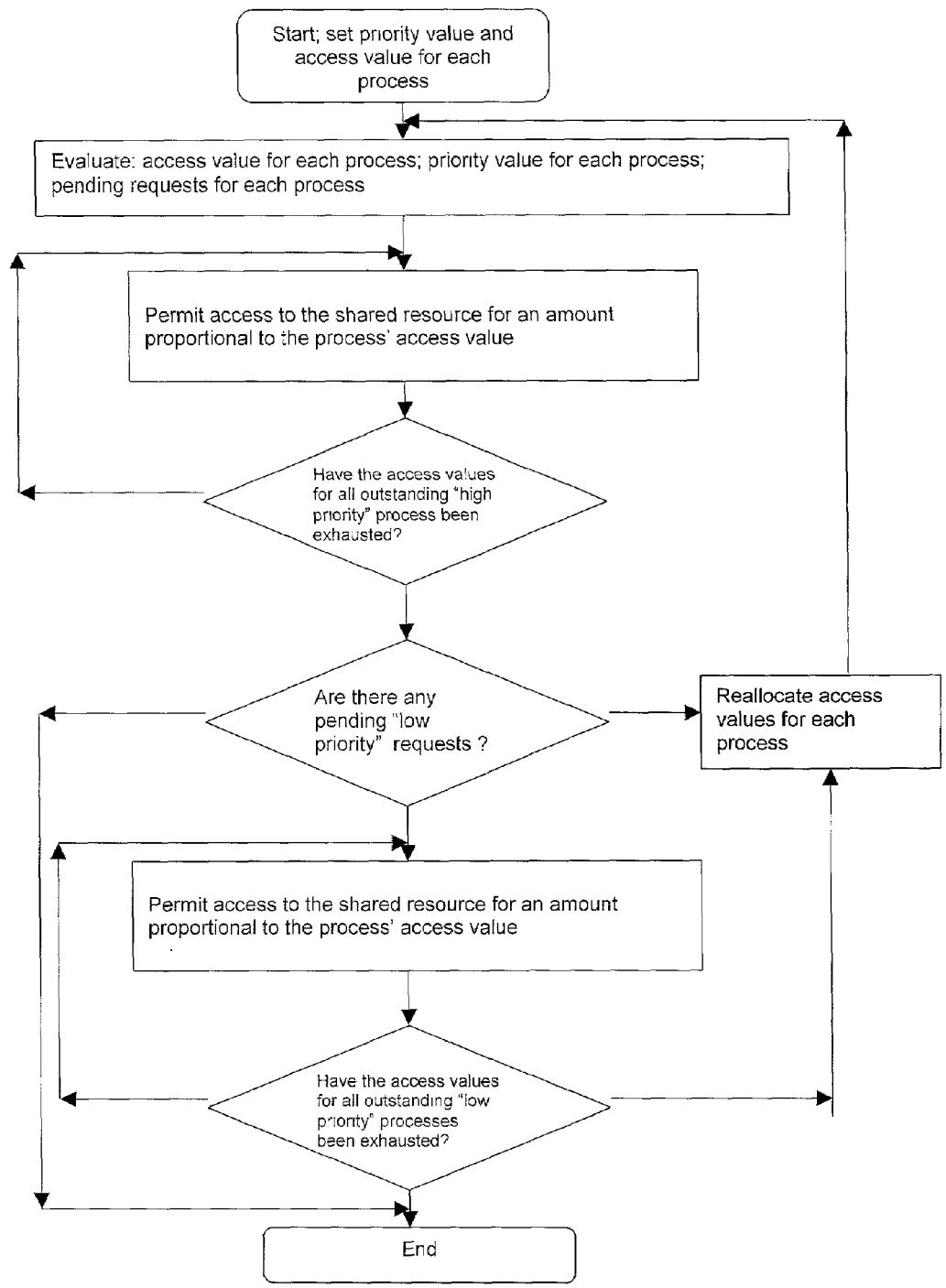
FIG. 2 illustrates a flow diagram illustrating an embodiment of the invention.

As shown in FIG. 2, a technique (200) is initialized (202) whereby the priority value and access value for each of four computer processes (110, 112, 114, 116) have been established. Next, the pending request for each process as well as its priority value and access value are evaluated (204). Access to the shared computer resource (130) is granted to the first process which has a pending "high" priority request. Access is permitted (206) to the shared computer resource (130) for an amount (i.e., time interval, number of processor clock cycles, etc.) based to the process' access value until the access value is decremented or otherwise exhausted.

Following the permitted access, the status of any pending requests are evaluated to establish if there remain any pending "high" priority requests (208), which have not exhausted their access valued, and if any such pending requests exist, access is permitted (206) to such processes. If no outstanding pending "high" priority requests remain, which indicates that all process having outstanding "high" priority requests have either been satisfied or have exhausted their access values, a determination (210) is made as to whether any "low" priority requests are present and pending among the processes. If it is determined (210) that no "low" priority requests are pending, the access value for each process (110, 112, 114, 116) is reallocated (212) by adding/incrementing to any existing access value of each process the access value originally assigned prior to any access cycle, and the technique (200) may repeat. Alternately, the technique may terminate (218). However, if the determination (210) is made that "low" priority requests are present and pending among the processes, which have not exhausted their access values, access is permitted (214) to the shared computer resource for an amount (i.e., time interval, interval of processor clock cycles, etc.) based to the process' access value until the access value is decremented or otherwise exhausted. This evaluation is repeated until all pending "low" priority requests are satisfied. If it is determined (216) that no "low" priority requests are pending, the priority value and access value for each process (110, 112, 114, 116) is reallocated (212) and the technique (200) may be permitted to repeat. Alternately, the technique may terminate (218).

An illustrative example of technique is described as follows:

Four processes, each requiring access to a shared computer resource, such as a SDRAM bank are indicated as "A", "B", "C" and "D", and the access value being represented as "$\alpha$" for each process. It is to be understood that in this illustrative example each of the four processes, "A", "B", "C" and "D" have priority values representing "high" priority. The process is initialized such that Process A is provided access to the shared computer resource, followed by Process B, then Process C and finally Process D. In this example, the access values for Process A, B, C and D are in a proportional ratio respectively having values of 1:1:4:2 .Therefore, Process A should receive a maximum of 12.5% of available bandwidth, Process B a maximum of 12.5%, Process C a maximum of 50% and Process D a maximum of 25% of available bandwidth. In the following Table, the status of the access value of each of the processes, A, B, C and D are indicated per unit interval of time, here indicated in 'clock cycles'.In the following Table, the access values for each process are represented by "$\alpha_x$" where "x" is the process A, B, C or D. In this particular example each request for a service, such as access to a shared computer resource, requires four clock cycles to satisfy the request.

TABLE 1

| Clock | A | B | C | D | Memory | Comments |
|---|---|---|---|---|---|---|
| 1 | 0 | 0 | 0 | 0 | 0 | Reset, set $\alpha_A = 1$, $\alpha_B = 1$, $\alpha_C = 4$, $\alpha_D = 2$ |
| 2 | 1 | 1 | 1 | 1 | A0 | All the processes make request A is first serviced |
| 3 | 0 | 1 | 2 | 1 | A1 | 4 units of time to execute |
| 4 | 0 | 1 | 2 | 2 | A2 | Decrement A's access value by 1 ($\alpha_A = \alpha_A - 1$) |
| 5 | 0 | 1 | 3 | 2 | A3 | $\alpha_A = 0$, $\alpha_B = 1$, $\alpha_C = 4$, $\alpha_D = 2$ |
| 6 | 0 | 0 | 4 | 2 | B0 | B is serviced next |
| 7 | 0 | 0 | 4 | 2 | B1 | |

TABLE 1-continued

| Clock | A | B | C | D | Memory | Comments |
|---|---|---|---|---|---|---|
| 8 | 0 | 0 | 5 | 2 | B2 | Decrement B's access value by 1 ($\alpha_{B0} = \alpha_B - 1$) |
| 9 | 0 | 0 | 5 | 2 | B3 | $\alpha_A = 0, \alpha_B = 0, \alpha_C = 4, \alpha_D = 2$ |
| 10 | 0 | 0 | 4 | 2 | C0 | C is serviced next |
| 11 | 0 | 0 | 4 | 2 | C1 | |
| 12 | 0 | 0 | 4 | 2 | C2 | Decrement C's access value by 1 ($\alpha_C = \alpha_C - 1$) |
| 13 | 0 | 0 | 4 | 2 | C3 | $\alpha_A = 0, \alpha_B = 0, \alpha_C = 3, \alpha_D = 2$ |
| 14 | 0 | 0 | 3 | 2 | C0 | C is serviced again, as it still has not exhausted its access value |
| 15 | 0 | 0 | 3 | 2 | C1 | |
| 16 | 0 | 0 | 3 | 3 | C2 | |
| 17 | 0 | 0 | 3 | 3 | C3 | $\alpha_A = 0, \alpha_B = 0, \alpha_C = 2, \alpha_D = 2$ |
| 18 | 0 | 0 | 2 | 3 | C0 | C is serviced again, as it still has not exhausted its access value |
| 19 | 0 | 0 | 2 | 3 | C1 | |
| 20 | 0 | 0 | 2 | 3 | C2 | |
| 21 | 0 | 0 | 2 | 3 | C3 | $\alpha_A = 0, \alpha_B = 0, \alpha_C = 1, \alpha_D = 2$ |
| 22 | 0 | 0 | 1 | 3 | C0 | C is serviced again, as it still has not exhausted its access value |
| 23 | 0 | 0 | 2 | 3 | C1 | |
| 24 | 0 | 0 | 2 | 3 | C2 | New request arrives at C, but it is not processed |
| 25 | 0 | 0 | 2 | 3 | C3 | $\alpha_A = 0, \alpha_B = 0, \alpha_C = 0, \alpha_D = 2$ |
| 26 | 1 | 0 | 2 | 2 | D0 | C's access value is exhausted, so D is serviced |
| 27 | 1 | 0 | 2 | 2 | D1 | New request arrives at A, but it is not processed |
| 28 | 1 | 0 | 2 | 2 | D2 | |
| 29 | 1 | 0 | 2 | 2 | D3 | $\alpha_A = 0, \alpha_B = 0, \alpha_C = 0, \alpha_D = 1$ |
| 30 | 1 | 0 | 3 | 1 | D0 | A and C do not get access, but D continues to get access |
| 31 | 1 | 0 | 3 | 1 | D1 | Since its access value is non-zero |
| 32 | 1 | 0 | 3 | 1 | D2 | |
| 33 | 1 | 1 | 3 | 1 | D3 | $\alpha_A = 0, \alpha_B = 0, \alpha_C = 0, \alpha_D = 0$ |
| 34 | 0 | 1 | 3 | 2 | A0 | A wins as Low Priority request, and the access values of each process are reallocated by adding to the existing access values the originally apportioned access values so that now $\alpha_A = 1, \alpha_B = 1, \alpha_C = 4, \alpha_D = 2$ |
| 35 | 0 | 1 | 4 | 2 | A1 | |
| 36 | 0 | 1 | 4 | 2 | A2 | |
| 37 | 0 | 1 | 4 | 2 | A3 | $\alpha_A = 0, \alpha_B = 1, \alpha_C = 4, \alpha_D = 2$ |
| 38 | 0 | 0 | 4 | 2 | B0 | |
| 39 | 0 | 0 | 4 | 2 | B1 | |
| 40 | 0 | 0 | 4 | 2 | B2 | |
| 41 | 0 | 0 | 4 | 2 | B3 | $\alpha_A = 0, \alpha_B = 0, \alpha_C = 4, \alpha_D = 2$ |
| 42 | 0 | 0 | 3 | 2 | C0 | |
| 43 | 0 | 0 | 3 | 2 | C1 | |
| 44 | 0 | 0 | 3 | 2 | C2 | |
| 45 | 0 | 0 | 4 | 2 | C3 | $\alpha_A = 0, \alpha_B = 0, \alpha_C = 3, \alpha_D = 2$ |
| 46 | 0 | 0 | 3 | 2 | C0 | |
| 47 | 0 | 0 | 3 | 2 | C1 | |
| 48 | 0 | 0 | 3 | 2 | C2 | |
| 49 | 0 | 0 | 3 | 2 | C3 | $\alpha_A = 0, \alpha_B = 0, \alpha_C = 2, \alpha_D = 2$ |

As is seen from Table 1, the technique ensures that all initial pending requests for access to the shared computer resource have been addressed and satisfied, prior to the processing of later-received requests (see Clock #24, and #27) which, due to the non-existence of initially pending "low" priority requests, are handled by the process as "low" priority requests and processed subsequent to all initially pending high priority requests.

A further illustration of the technique is described as follows:

Six processes, each requiring access to a shared computer resource, such as a SDRAM bank are indicated as "A", "B", "C", "D", "E" and "F". Each of A, B, C and D has associated priority value representative of "high" priority while processes E and F have an associated priority value representative of a "low" priority. Each of A, B, C, D, E and F also have associated therewith access value ("$\alpha$"). In this example, the access values for Process A, B, C, D, E and F are established or initiated to have a ratio of 1:1:4:2:0.5:0.5. It will be understood then that Process A should receive a maximum of 11.1% of available bandwidth, Process B a maximum of 11.1%, Process C a maximum of 44.4%, Process D a maximum of 22.2%, Process C a maximum of 5.5%, and Process F a maximum of 5.5% of available bandwidth. In Table 2, the status of the access value of each of the processes, A, B, C, D, E and F are indicated per unit interval of time, here indicated in 'clock cycles'. In the following Table, the access values for each process are represented by "$\alpha_x$" where "x" is the process A, B, C, D, E or F. In this particular example each request for a service, access to a shared computer resource, requires four clock cycles for each "high" priority request from a computer process (sometimes also referred to as a "client") but only or two clock cycles for each "low" priority request in order to satisfy a particular request.

TABLE 2

| Clock | A | B | C | D | E | F | Memory | Comments |
|---|---|---|---|---|---|---|---|---|
| 1 | 0 | 0 | 0 | 0 | 0 | 0 | 0 | Reset, $\alpha_A = 1, \alpha_B = 1, \alpha_C = 4, \alpha_D = 2, \alpha_E = 0\ 5, \alpha_F = 0\ 5$ |
| 2 | 1 | 1 | 1 | 1 | 1 | 1 | A0 | All the processes make request, A wins Each request takes |
| 3 | 0 | 1 | 2 | 1 | 1 | 1 | A1 | 4 units of time to execute. E and F have requests pending. |
| 4 | 0 | 1 | 2 | 2 | 1 | 1 | A2 | Decrement A's access value by 1 |
| 5 | 0 | 1 | 3 | 2 | 1 | 1 | A3 | $\alpha_A = 0, \alpha_B = 1, \alpha_C = 4, \alpha_D = 2, \alpha_E = 0\ 5, \alpha_F = 0\ 5$ |
| 6 | 0 | 0 | 4 | 2 | 1 | 1 | B0 | B is next provided |
| 7 | 0 | 0 | 4 | 2 | 1 | 1 | B1 | |
| 8 | 0 | 0 | 5 | 2 | 1 | 1 | B2 | Decrement B's access value by 1 |
| 9 | 0 | 0 | 5 | 2 | 1 | 1 | B3 | $\alpha_A = 0, \alpha_B = 0, \alpha_C = 4, \alpha_D = 2, \alpha_E = 0\ 5, \alpha_F = 0\ 5$ |
| 10 | 0 | 0 | 4 | 2 | 1 | 1 | C0 | C is next provided access |
| 11 | 0 | 0 | 4 | 2 | 1 | 1 | C1 | |
| 12 | 0 | 0 | 4 | 2 | 1 | 1 | C2 | Decrement C's access value by 1 |
| 13 | 0 | 0 | 4 | 2 | 1 | 1 | C3 | $\alpha_A = 0, \alpha_B = 0, \alpha_C = 3, \alpha_D = 2, \alpha_E = 0\ 5, \alpha_F = 0\ 5$ |
| 14 | 0 | 0 | 3 | 2 | 1 | 1 | C0 | C is serviced again, as it has a remaining access value |
| 15 | 0 | 0 | 3 | 2 | 1 | 1 | C1 | |
| 16 | 0 | 0 | 3 | 3 | 1 | 1 | C2 | |
| 17 | 0 | 0 | 3 | 3 | 1 | 1 | C3 | $\alpha_A = 0, \alpha_B = 0, \alpha_C = 2, \alpha_D = 2, \alpha_E = 0\ 5, \alpha_F = 0\ 5$ |
| 18 | 0 | 0 | 2 | 3 | 1 | 1 | C0 | |

TABLE 2-continued

| Clock | A | B | C | D | E | F | Memory | Comments |
|---|---|---|---|---|---|---|---|---|
| 19 | 0 | 0 | 2 | 3 | 1 | 1 | C1 | |
| 20 | 0 | 0 | 2 | 3 | 1 | 1 | C2 | |
| 21 | 0 | 0 | 2 | 3 | 1 | 1 | C3 | $\alpha_A = 0, \alpha_B = 0, \alpha_C = 1, \alpha_D = 2, \alpha_E = 0\ 5, \alpha_F = 0\ 5$ |
| 22 | 0 | 0 | 1 | 3 | 1 | 1 | C0 | |
| 23 | 0 | 0 | 2 | 3 | 1 | 1 | C1 | |
| 24 | 0 | 0 | 2 | 3 | 1 | 1 | C2 | New request arrives at C, but it is a non-initial process and is not provided access to the shared resource as this time |
| 25 | 0 | 0 | 2 | 3 | 1 | 1 | C3 | $\alpha_A = 0, \alpha_B = 0, \alpha_C = 0, \alpha_D = 2, \alpha_E = 0\ 5, \alpha_F = 0\ 5$ |
| 26 | 1 | 0 | 2 | 2 | 1 | 1 | D0 | C's access value is exhausted, so D is serviced |
| 27 | 1 | 0 | 2 | 2 | 1 | 1 | D1 | New request arrives at A, but as it is a non-initial process and is not provided access to the shared resource as this time |
| 28 | 1 | 0 | 2 | 2 | 1 | 1 | D2 | |
| 29 | 1 | 0 | 2 | 2 | 1 | 1 | D3 | $\alpha_A = 0, \alpha_B = 0, \alpha_C = 0, \alpha_D = 1, \alpha_E = 0\ 5, \alpha_F = 0\ 5$ |
| 30 | 1 | 0 | 3 | 1 | 1 | 1 | D0 | A and C do not get access to the shared resource, but D continues to get access as its access value is non-zero |
| 31 | 1 | 0 | 3 | 1 | 1 | 1 | D1 | |
| 32 | 1 | 0 | 3 | 1 | 1 | 1 | D2 | |
| 33 | 1 | 1 | 3 | 1 | 1 | 1 | D3 | $\alpha_A = 0, \alpha_B = 0, \alpha_C = 0, \alpha_D = 0, \alpha_E = 0\ 5, \alpha_F = 0\ 5$ all "high" priority processes have exhausted their access values; access by "low" priority processes is initiated |
| 34 | 1 | 1 | 3 | 1 | 0 | 1 | E0 | E is the low priority client with the highest priority value, so it is given access to the shared computer resource, $\alpha_E = 0, \alpha_F = 0\ 5$ |
| 35 | 1 | 1 | 3 | 1 | 0 | 1 | E1 | |
| 36 | 1 | 1 | 3 | 1 | 0 | 0 | F0 | F wins the arbitration as the highest low priority process, with a non-zero access value, $\alpha_E = 0, \alpha_F = 0$ |
| 37 | 1 | 1 | 3 | 1 | 0 | 0 | F1 | |
| 38 | 0 | 1 | 3 | 2 | 0 | 0 | A0 | A wins as low priority client, and the access values are reset $\alpha_A = 1, \alpha_B = 1, \alpha_C = 4, \alpha_D = 2, \alpha_E = 0\ 5, \alpha_F = 0\ 5$ |
| 39 | 0 | 1 | 4 | 2 | 0 | 0 | A1 | |
| 40 | 0 | 1 | 4 | 2 | 0 | 0 | A2 | |
| 41 | 0 | 1 | 4 | 2 | 0 | 0 | A3 | $\alpha_A = 0, \alpha_B = 1, \alpha_C = 4, \alpha_D = 2, \alpha_E = 0\ 5, \alpha_F = 0\ 5$ |
| 42 | 0 | 0 | 4 | 2 | 0 | 0 | B0 | |
| 43 | 0 | 0 | 4 | 2 | 0 | 0 | B1 | |
| 44 | 0 | 0 | 4 | 2 | 0 | 0 | B2 | |
| 45 | 0 | 0 | 4 | 2 | 0 | 0 | B3 | $\alpha_A = 0, \alpha_B = 0, \alpha_C = 4, \alpha_D = 2, \alpha_E = 0\ 5, \alpha_F = 0\ 5$ |
| 46 | 0 | 0 | 3 | 2 | 0 | 0 | C0 | |
| 47 | 0 | 0 | 3 | 2 | 0 | 0 | C1 | |
| 48 | 0 | 0 | 3 | 2 | 0 | 0 | C2 | |
| 49 | 0 | 0 | 4 | 2 | 0 | 0 | C3 | $\alpha_A = 0, \alpha_B = 0, \alpha_C = 3, \alpha_D = 2, \alpha_E = 0\ 5, \alpha_F = 0\ 5$ |
| 50 | 0 | 0 | 3 | 2 | 0 | 0 | C0 | |
| 51 | 0 | 0 | 3 | 2 | 0 | 0 | C1 | |
| 52 | 0 | 0 | 3 | 2 | 0 | 0 | C2 | |
| 53 | 0 | 0 | 3 | 2 | 0 | 0 | C3 | $\alpha_A = 0, \alpha_B = 0, \alpha_C = 2, \alpha_D = 2, \alpha_E = 0\ 5, \alpha_F = 0\ 5$ |

As is evident from Table 2, the technique ensures that all initial pending "high" priority requests for access to the shared computer resource have been addressed, prior to the processing of initially pending "low" priority requests ("E" and "F") or later-received non-initially pending requests of "A" and "C" (see clock #24, and #27). Also as is evident from Table 2, according to the inventive technique, the initially pending "low" priority requests ("E" and "F") ensured access to the shared computer resource before the later-received non-initially pending requests of the "high" priority clients which are converted to "low" priority requests. As disclosed on Table 2, each of the processes, A, B, C, D, E and F are ensured access to the shared computer resource.

It is to be understood that while the process described above has been described in FIG. 1 and Table 1 with respect to a computer based shared memory system includes a representation of four computer processes (110, 112, 114, 116), a memory controller (120) and as a shared resource, a bank of shared memory, here a bank of SDRAM memory (130), it is to be understood that the process is not limited to use with any particular hardware or software configuration, as it finds applicability in any computing or processing environment where two or more processes require access to a common shared resource. The process may be implemented in hardware, or in software, or in any combination of hardware and software. The process may be implemented in computer programs executing on programmable computers that each include a processor, a storage medium readable by the processor (including volatile memory, non-volatile memory, and/or other storage medium), at least one input device, and at least one output device. Such computer programs implementing the process may be implemented in a high level procedural language, in an object-oriented programming language, or in a low-level programming language such as assembly or machine language. The language may be a compiled or an interpreted language. The computer programs implementing the process may be stored on a storage medium or device (e.g., CD-ROM, DVD, magneto-optical disk, magnetic disk such as a hard disk, diskette, ROM, EEPROM, EPROM, etc.) that is readable by a general or special purpose programmable computer for configuring and operating the computer when the storage medium or device is read by the computer in order to perform the process described herein. The process may also be implemented as a computer-readable storage medium, configured with a computer program, where, upon execution, instructions in the computer program cause the computer or other computing machine to operate in accordance with the program.

The technique described here can provide fair and guaranteed access to a shared computer resource by multiple processes, so that no process will be wholly foreclosed from access to the shared computer resource. Other implementations are also possible, and fall within the scope of the following claims.

The invention claimed is:

1. A method, comprising:
assigning an access value and a priority value to each of a plurality of computer processes which request access to a shared computer resource, where the priority value can be high priority or low priority;
during an first access cycle, first providing access to processes whose priority value represents high priority and whose access value represents that access should still be granted during the access cycle, and after granting each access, adjusting an access value associated with said each access to indicate that additional access has been granted;
determining, during said first access cycle, that all high priority requests have access values that indicate that no additional access should be granted;
responsive to said determining, in said first access cycle, providing access to low priority requests whose access values represent that access should be granted, and adjusting access values after granting the access; and
after determining that both the high priority requests and low priority requests each have access values that represent no further access should be granted in said first access cycle, starting a new access cycle with new access values and priority values.

2. The method according to claim 1 wherein at least one of the computer processes is an isochronous process.

3. The method according to claim 1 wherein at least one of the computer processes is an asynchronous process.

4. An article comprising a computer readable media which stores executable instructions for controlling access to a shared computer resource by at least two computer processes, the instructions, when executed, causing the computer to:
assign an access value and a priority value to each of a plurality of computer processes which request access to a shared computer resource, where the priority value can be high priority or low priority;
during a first access cycle, first provide access to processes whose priority value represents high priority and whose access value represents that access should still be granted during the access cycle, and after granting each access, adjust an access value associated with said access to indicate that additional access has been granted;
determine, during said first access cycle, that all high priority requests have access values that indicate that no additional access should be granted;
responsive to said determining, in said first access cycle, provide access to low priority requests whose access values indicate that access should be granted, and adjust access values after granting the access; and
after determining that both the high priority requests and low priority requests each have access values that represent no further access should be granted in said first access cycle, start a new access cycle with new access values and priority values.

5. The article according to claim 4 wherein at least one of the computer processes is an isochronous process.

6. The article according to claim 4 wherein at least one of the computer processes is an asynchronous process.

7. An apparatus, comprising:
a controller device, having a first port for connecting to a shared resource, and at least one second port for connecting to a plurality of different processes which are requesting access to the shared resource,
a memory operating to store access values,
said controller operating to:
assign an access value and a priority value to each of a plurality of computer processes which request access to the shared resource, where the priority value can be high priority or low priority, and store said values in said memory, during a first access cycle, first controlling said processes to provide access to processes whose priority value represents high priority and whose access value represents that access should still be granted during the access cycle, and after granting each access, adjusting an access value associated with said access to indicate that additional access has been granted, determining, during said first access cycle, that all high priority requests have access values that indicate that no additional access should be granted, responsive to said determining, in said first access cycle, providing access to low priority requests whose access values represent that access should be granted, and adjusting access values after granting the access; and
after determining that both the high priority requests and low priority requests each have access values that represent no further access should be granted in said first access cycle, starting a new access cycle with new access values and priority values.

8. The apparatus according to claim 7 wherein at least one of the computer processes is an isochronous process.

9. The apparatus according to claim 7 wherein at least one of the computer processes is an asynchronous process.

10. The apparatus according to claim 7 wherein:
the shared resource comprises a shared memory bank; and
the controller device comprises a memory controller.

* * * * *